(12) United States Patent
Grabarz

(10) Patent No.: US 6,918,980 B2
(45) Date of Patent: Jul. 19, 2005

(54) TURN-UP DEVICE FOR MAKING A MOLDED BODY OF AN AIR SPRING FOR A VEHICLE WHEEL SUSPENSION OR A LIFT AXLE

(75) Inventor: Andrew J. Grabarz, Cicero, IN (US)

(73) Assignee: BFS Diversified Products, LLC, Carmel, IN (US)

( * ) Notice: Subject to any disclaimer, the term of this patent is extended or adjusted under 35 U.S.C. 154(b) by 274 days.

(21) Appl. No.: 10/144,523

(22) Filed: May 13, 2002

(65) Prior Publication Data

US 2002/0180128 A1 Dec. 5, 2002

Related U.S. Application Data

(60) Provisional application No. 60/317,297, filed on Sep. 5, 2001, and provisional application No. 60/294,784, filed on May 31, 2001.

(51) Int. Cl.[7] .................................................. B29D 30/32
(52) U.S. Cl. ........................................ 156/132; 156/402
(58) Field of Search ............................. 156/132, 400, 156/402

(56) References Cited

U.S. PATENT DOCUMENTS

| | | | |
|---|---|---|---|
| 2,409,974 A | 10/1946 | Breth et al. ................... 154/10 |
| 2,614,952 A | 10/1952 | Kraft ............................. 154/10 |
| 2,838,091 A | 6/1958 | Kraft .............................. 154/9 |
| 2,874,458 A | 2/1959 | Smith ........................... 29/436 |
| 2,971,562 A | 2/1961 | Hollis ............................. 154/1 |
| 3,018,518 A | 1/1962 | Jefferys .......................... 18/19 |
| 3,075,570 A | 1/1963 | Garver ......................... 156/400 |
| 3,093,531 A | 6/1963 | Frohlich et al. ............. 156/400 |
| 3,765,986 A | 10/1973 | Brey ........................... 156/400 |
| 3,887,423 A | 6/1975 | Gazuit ......................... 156/402 |
| 4,057,454 A | 11/1977 | Smith et al. ................. 156/401 |
| 4,362,592 A | 12/1982 | Ruppel ........................ 156/402 |
| 4,412,965 A | 11/1983 | Thompson et al. .......... 264/257 |
| 4,673,168 A | 6/1987 | Warmuth et al. ......... 267/64.27 |
| 4,749,345 A | 6/1988 | Warmuth et al. ............. 425/44 |

FOREIGN PATENT DOCUMENTS

FR          1 187 975 A         9/1959  ......................... 5/3

OTHER PUBLICATIONS

International Search Report (PCT/ISA/210) For PCT/US02/13588, Nov. 28, 2002.

*Primary Examiner*—Gladys J P Corcoran
(74) *Attorney, Agent, or Firm*—Michael R. Huber

(57) ABSTRACT

A turn-up device (40) for making a molded body of an airspring on a mechanical drum having expandable end portions. The device (40) comprises a support member (42), a plurality of turning arms (44) pivotally mounted to the support member (42), and a sleeve (46) resiliently mounted to the support member (42). The turning arms (44) are movable between radially inner and outer positions and are biased to the radially inner position. The sleeve (46) is movable relative to the arms (44) between a position whereat it holds the arms (44) in the radially outer position and a position whereat it releases the arms (44) so that they can be biased to the radially inner position. The airspring can be used in a large vehicle wheel suspension (i.e., a bus or a truck) and/or can be used to manipulate the lift axle of, for example, a large dump truck.

10 Claims, 6 Drawing Sheets

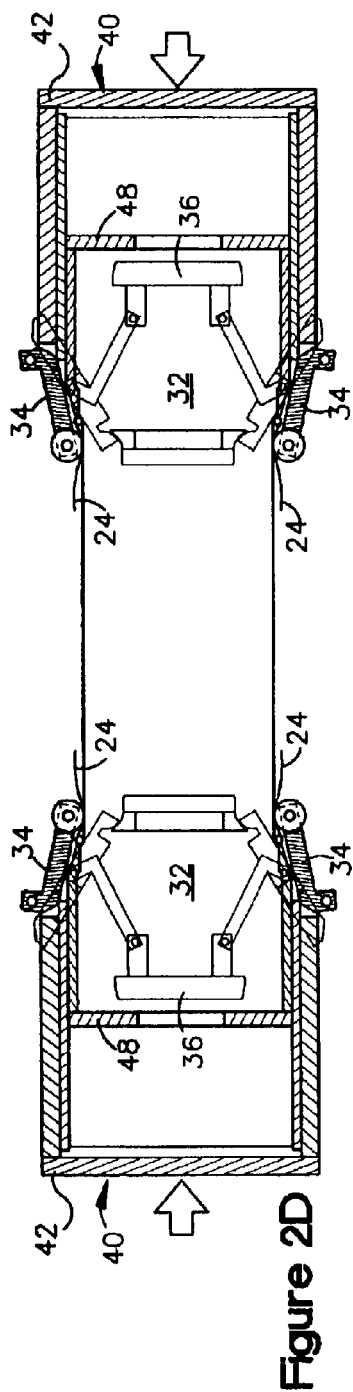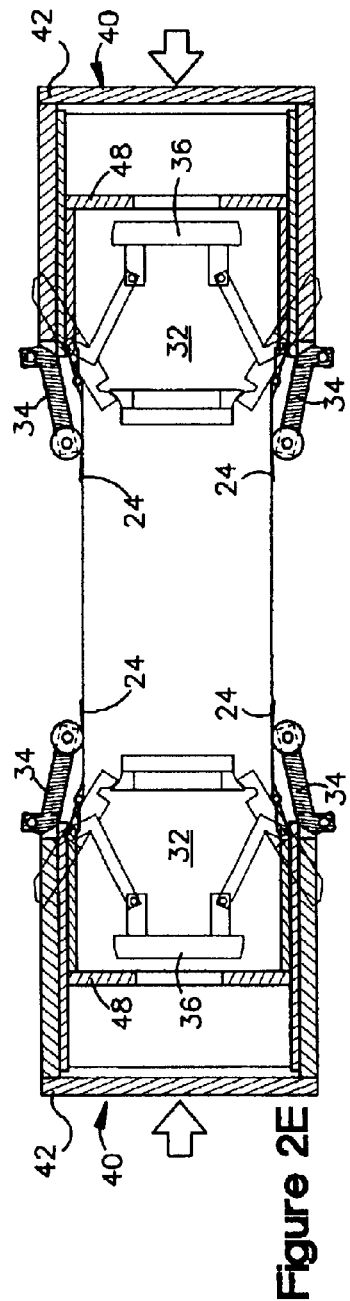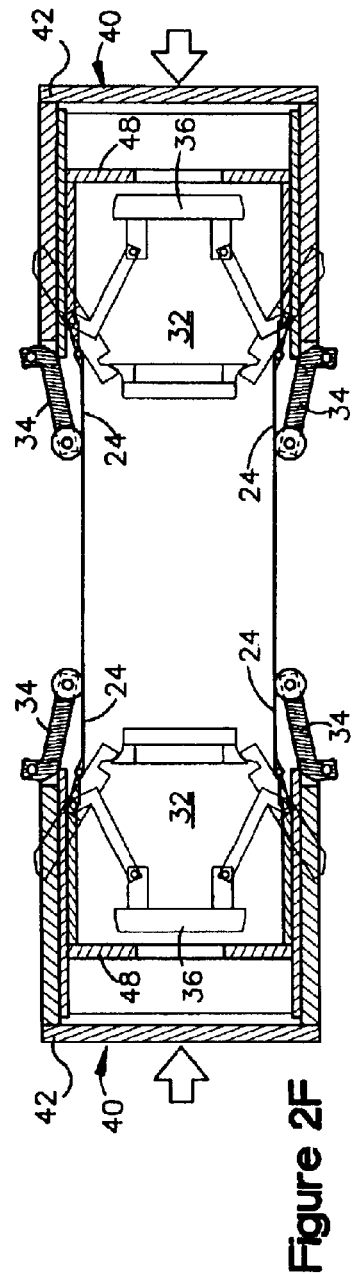

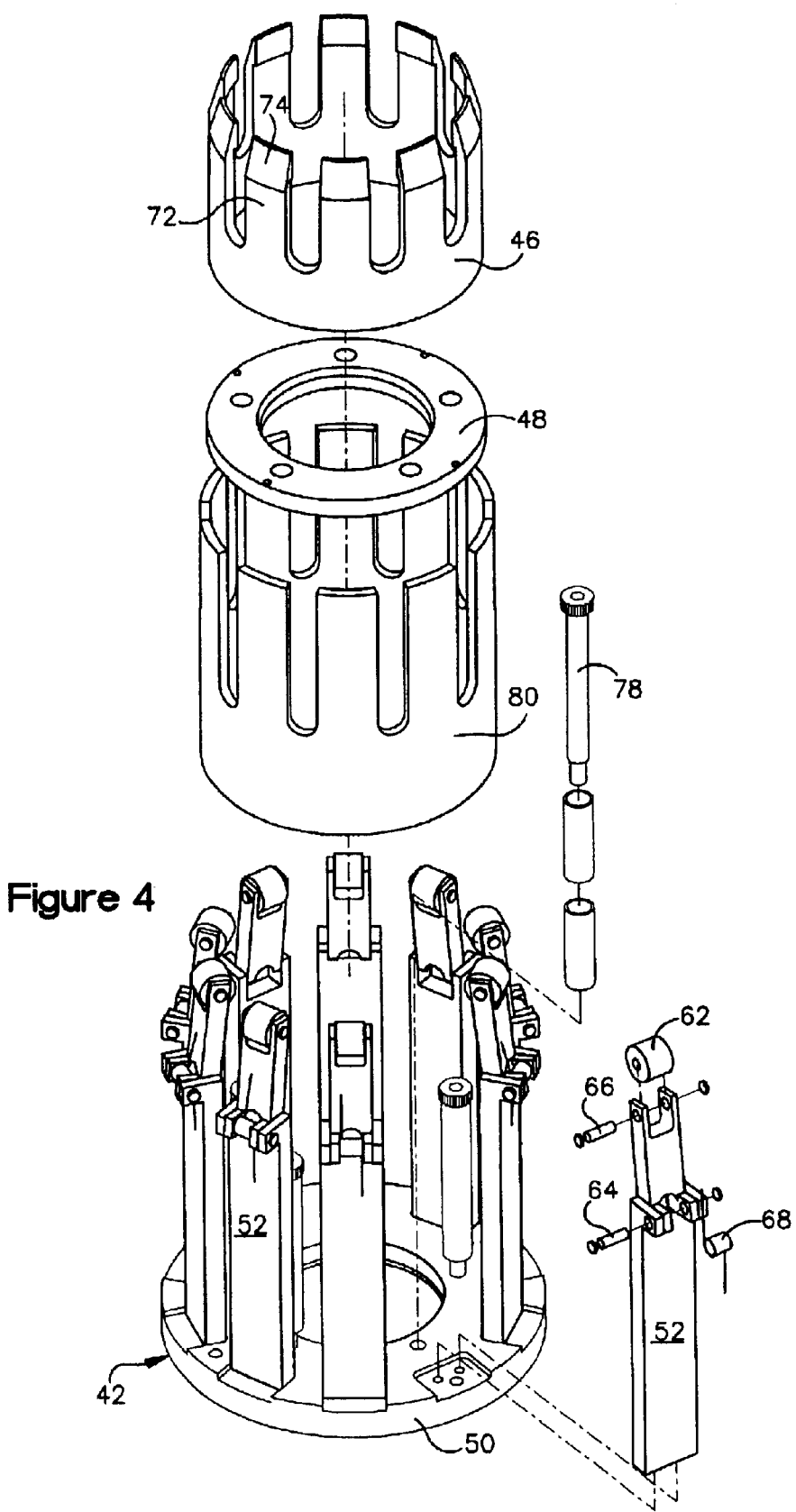

TURN-UP DEVICE FOR MAKING A MOLDED BODY OF AN AIR SPRING FOR A VEHICLE WHEEL SUSPENSION OR A LIFT AXLE

RELATED APPLICATIONS

This application claims priority under 35 U.S.C. §119 to U.S. Provisional Patent Application No. 60/294,784 filed on May 31, 2001 and U.S. Provisional Patent Application No. 60/317,297 filed on Sep. 5, 2001. The entire disclosures of these earlier applications are hereby incorporated by reference.

FIELD OF THE INVENTION

The present invention relates generally as indicated to a turn-up device for making a molded body of an air spring for a vehicle wheel suspension or a lift axle and, more particularly to a turn-up device for an air spring made on a mechanical drum having expandable end portions.

BACKGROUND OF THE INVENTION

An airspring can be used in a large vehicle wheel suspension (i.e., a bus or a truck) and/or can be used to manipulate the lift axle of, for example, a large dump truck. In either event, such an airspring commonly comprises a molded body, axial plates to which beads of the molded body are anchored, and a girdle hoop for separating convolutions in the molded body. The molded body comprises rubberized fabric plies having axial end sections wrapped around a circular ring to form the beads of the airspring. The molded body is typically made by building a green preform which is then expanded and shaped by fluid pressure in a heated mold and vulcanized to form the desired shape.

The green preform for the airspring can be built on a mechanical drum. First, multiple plies (i.e., three) of an inner gum liner is assembled on the drum. The fabric plies are then wrapped around the drum to form a cylindrical shape and the bead rings are appropriately aligned with the wrapped fabric plies. End portions of the drum are then radially expanded to seat the bead rings at the correct position relative to the fabric. The end sections of the fabric plies are then turned over the bead rings and the turned end sections are stitched about the beads. After the turn-up is made, cover plies are assembled on the drum to to complete the assembly of the green preform.

Of particular relevance to the present invention is the turn-up device used to turn the end sections of the fabric plies over the bead rings. When a mechanical drum is used to make the green preform, its expandable end portions are each typically comprised of radially movable segments which are separated by slots. The turn-up device has turning components which are inserted into these slots to push the end sections of the fabric plies inwardly and about the bead ring.

The turning device can comprise a sleeve having a series of fingers which are sized and shaped for insertion between the segments in the drum's expandable end portions. (See e.g., U.S. Pat. No. 2,971,562.) The fingers together define a diameter only slightly greater than the diameter of the bead ring and the tolerance of the differential between these diameters has to be substantially tight to insure proper turning. Additionally, with a sleeve as the turning component, longer turn-up lengths cannot be consistently accomplished. Moreover, there is always the potential of the sleeve pushing the bead out of its desired seated position.

To eliminate the bead-unseating problem, an inner sleeve can be positioned within the turning sleeve to hold the bead during the turn-up steps. Such an inner sleeve can comprise a crown-shaped structure having a plurality of fingers aligned with the fingers of the turning sleeve so that it can fit within slots formed by the expanded drum portions. The ends of the fingers of the inner sleeve each have a J-shape recess which together form a cradle for holding the bead during the turn-up steps. When the turn-up device is moved towards the drum, the bead (and the fabric underneath the bead) is received in the recesses and a spring-mounted platform of the inner sleeve contacts the drum. As the turning device continues to move towards the drum, the inner sleeve remains in the same position by compression of its spring mounting and the turning fingers move inward from the inner sleeve to turn the ends of the fabric plies over the bead ring.

While the addition of the bead-holding inner sleeve prevents the bead from moving, it does not help the tight tolerance requirements and, in fact, introduces other tight tolerance issues between the inner sleeve and the outer sleeve and/or between the inner sleeve and the bead. Also, since a sleeve is still the turning component, the length of turn-ups is limited and longer turn-ups can not be consistently accomplished.

SUMMARY OF THE INVENTION

The present invention provides a turn-up device for making an airspring on a drum having mechanically expandable end portions with slots between segments when the end portion is an expanded condition. The turn-up device is capable of consistently accomplishing longer turn-ups which translates into increased strength and extended life for the airspring. Also, the turn-up device can be constructed without tight tolerance requirements, and need not employ a bead-holding means.

More particularly, the present invention provides a turn-up device comprising a support member movable towards an end portion of the drum, a plurality of arms pivotally mounted to the support member, and a sleeve movably mounted (e.g., resiliently mounted) to the support member. The plurality of arms are pivotal between radially inner and outer positions and are biased to the radially inner position. The arms are positioned and sized for insertion into the spaces between the segments of the expandable end portion of the drum. A roller can be provided at the distal end of each of the arms.

The sleeve is movable between a position whereat it holds the arms in the radially outer position and a position whereat it releases the arms so that they can be biased to the radially inner position. The sleeve can provide a cam surface for the rollers of the turning arms to ride on as the sleeve moves relative to the arms. The sleeve can comprise fingers aligned with the turning arms for insertion into the spaces between the segments of the expandable end portion of the drum and each finger can include a cam surface for the respective roller.

When the turn-up device of the present invention is used to turn an end section of fabric plies over the bead ring, the turning device is positioned adjacent the respective end portion of the drum so that its turning arms are aligned with the spaces between the segments of the expandable end portions of the drum. The support member is then moved inwardly towards the end portion of the drum so that the turning arms contact the end section of the fabric plies while the sleeve is still in the position which holds the turning arms in their radially outer position. The sleeve is then moved relative to the arms to the position whereat it releases the arms so that they can be biased to the radially inner position. Because the arms are biased inwardly, they can follow the contour of the drum without tight tolerance requirements. Also, the release of the turning arms can occur at an appropriate point (e.g., after clearance of a centerline of the bead ring) so that the risk of the bead unseating is minimized and bead-holding means need not be employed.

Accordingly, the turning device and method of the present invention can be used to make a molded body for an airspring comprising rubberized fabric plies and a pair of circular rings. The rubberized fabric plies have axial end sections wrapped around the respective rings to form beads and these end sections can be longer than conventional turn-up lengths. For example, the end sections can each have a length of about 1½ inches or more, about 1¾ inches or more, about 2 inches or more, and/or about 2¼ inches or more. The airspring of the present invention can be used in a large vehicle wheel suspension (i.e., a bus or a truck) and/or can be used to manipulate the lift axle of, for example, a large dump truck.

The present invention provides these and other features hereinafter fully described and particularly pointed out in the claims. The following description and drawings set forth in detail certain illustrative embodiments of the invention. This embodiment is indicative, however, of but one of the various ways in which the principles of the invention can be employed.

DRAWINGS

FIGS. 2A–2F are schematic views showing respective steps of a method of making the green preform for the airspring.

FIG. 4 is an exploded view of the parts of the turn-up device.

DETAILED DESCRIPTION

Figure 1:
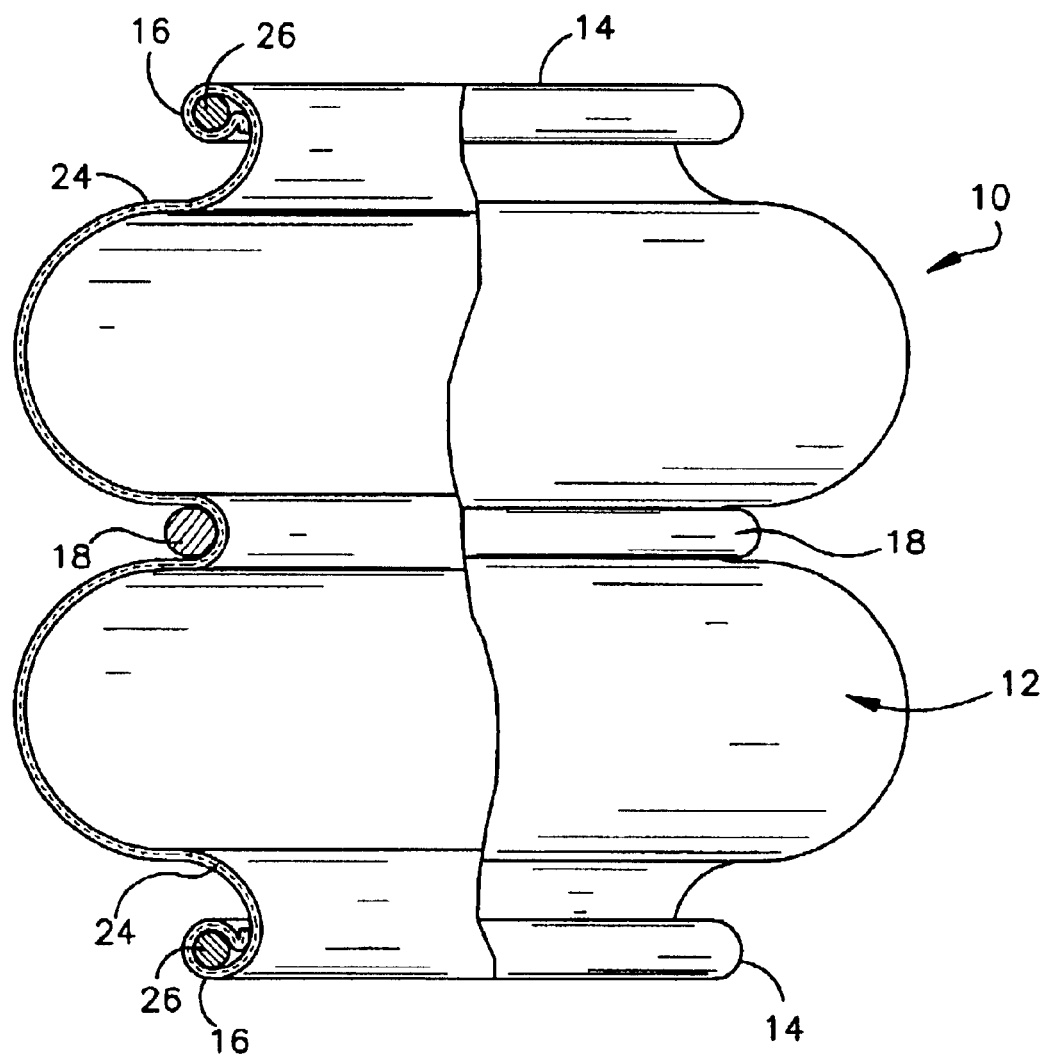
FIG. 1 is a side elevation, partly in section, of an airspring according to the present invention, the airspring being molded from a green preform.

Referring now to the drawings in detail, and initially to FIG. 1, an airspring 10 according to the present invention is shown. The airspring 10 comprises a molded body 12, axial plates 14 to which beads 16 of the molded body 12 are anchored, and a girdle hoop 18 for separating convolutions in the molded body 12. The molded body 12 comprises rubberized fabric plies 22 having axial end sections 24 wrapped around a circular ring 26 to form the beads 16. According to the present invention, the end sections 24 can be longer than conventional turn-up lengths and this translates into increased strength and extended life for the airspring. For example, the end sections 24 can each have a length of about 1½ inches or more, about 1¾ inches or more, about 2 inches or more, and/or about 2¼ inches or more.

Figure 2A:
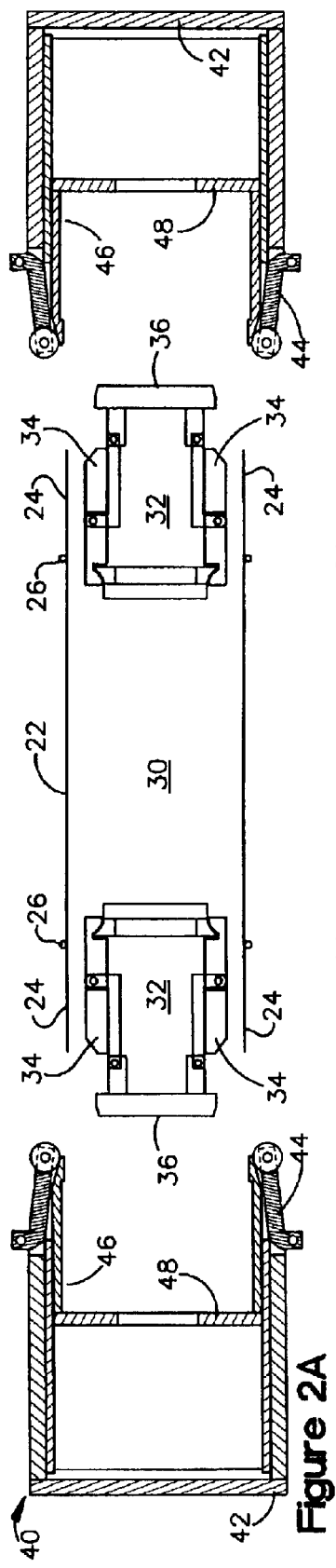
Figure 2B:
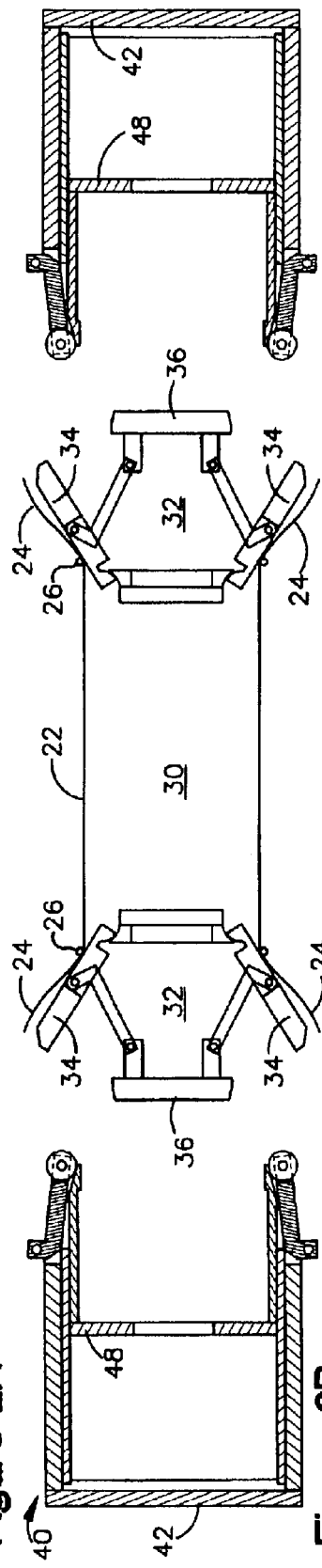

Referring now to FIGS. 2A–2F, a method of making a green preform of the molded body 12 on a mechanical drum 30 according to the present invention is shown. In this method, the fabric plies 22 are wrapped around the drum 30 to form a cylindrical shape and the bead rings 26 are appropriately aligned with the wrapped fabric plies. (FIG. 2A.) End portions 32 of the drum 30 have a plurality (ten in the illustrated embodiment) of radially movable segments 34 which are then radially expanded to seat the bead rings 26 at the correct position relative to the fabric plies 22. (FIG. 2B.) It may be noted that the radially expanded end portions 32 of the drum 30 support the end sections 24 of the fabric plies 22 whereby, since longer turn-ups are possible with the present invention, the length of the drum end portions 32 may have to be correspondingly increased. It may also be noted that caps 36 of the drum 30 remain in their original position and are axially positioned outward from the ends of the expanded portions.

The end sections 24 of the fabric plies 22 are then turned over the bead rings 26 with a pair of turn-up devices 40 according to the present invention. As is shown schematically in FIGS. 2C–2F, each turn-up device 40 has a support member 42 selectively movable towards the respective end portion 32 of the drum 30, a plurality of turning arms 44 mounted on the support member 42, and a sleeve 46 mounted to the support member 42 by a spring-loaded platform 48. The turning arms 44 are pivotally mounted to the support member 42 for movement between radially inner and outer positions and they are biased to the radially inner position. The sleeve 46 is movable relative to the turning arms 44 (via the spring-loaded platform 48) between a position whereat it holds the arms 44 in the radially outer position and a position whereat it releases the arms 44 so that they can be biased to the radially inner position. The turning arms 44 are sized and positioned for insertion between the segments 34 to push the end sections 24 inwardly and about the bead ring 26.

Figure 2C:
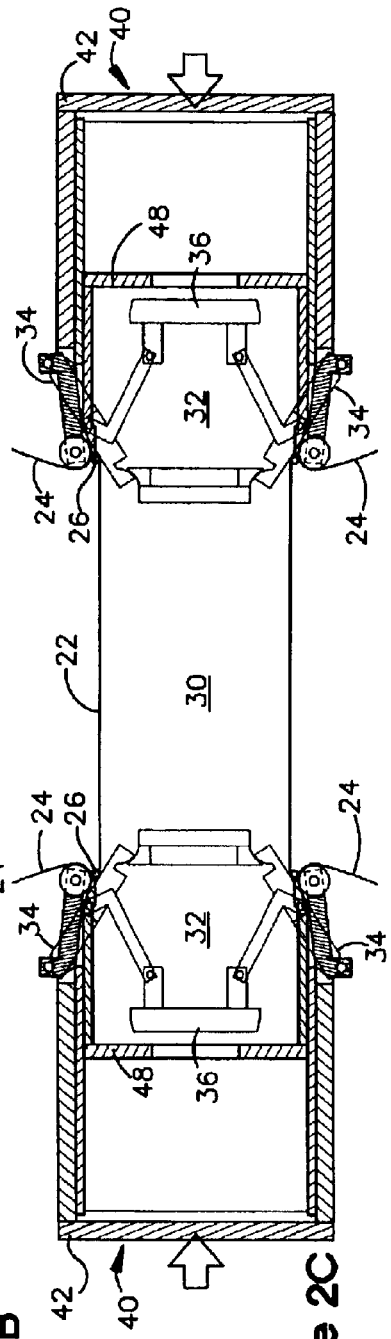

To turn the ply end sections 24 over the bead rings 26, the support members 42 are moved inwardly towards the drum 30 and the turning arms 44 contact the end sections 24. (FIG. 2C.) As the support members 42 continue to move inward, the end sections 24 are pushed inwardly by the turning arms 44. (FIG. 2D.) Once the platforms 48 contact the drum caps 36, the compression of the spring-loading occurs upon further inward movement of the support members 42. (FIG. 2E.) The turning arms 44 continue to move inward to push the end sections 24 about the bead ring 26. (FIG. 2F.)

Figure 3:
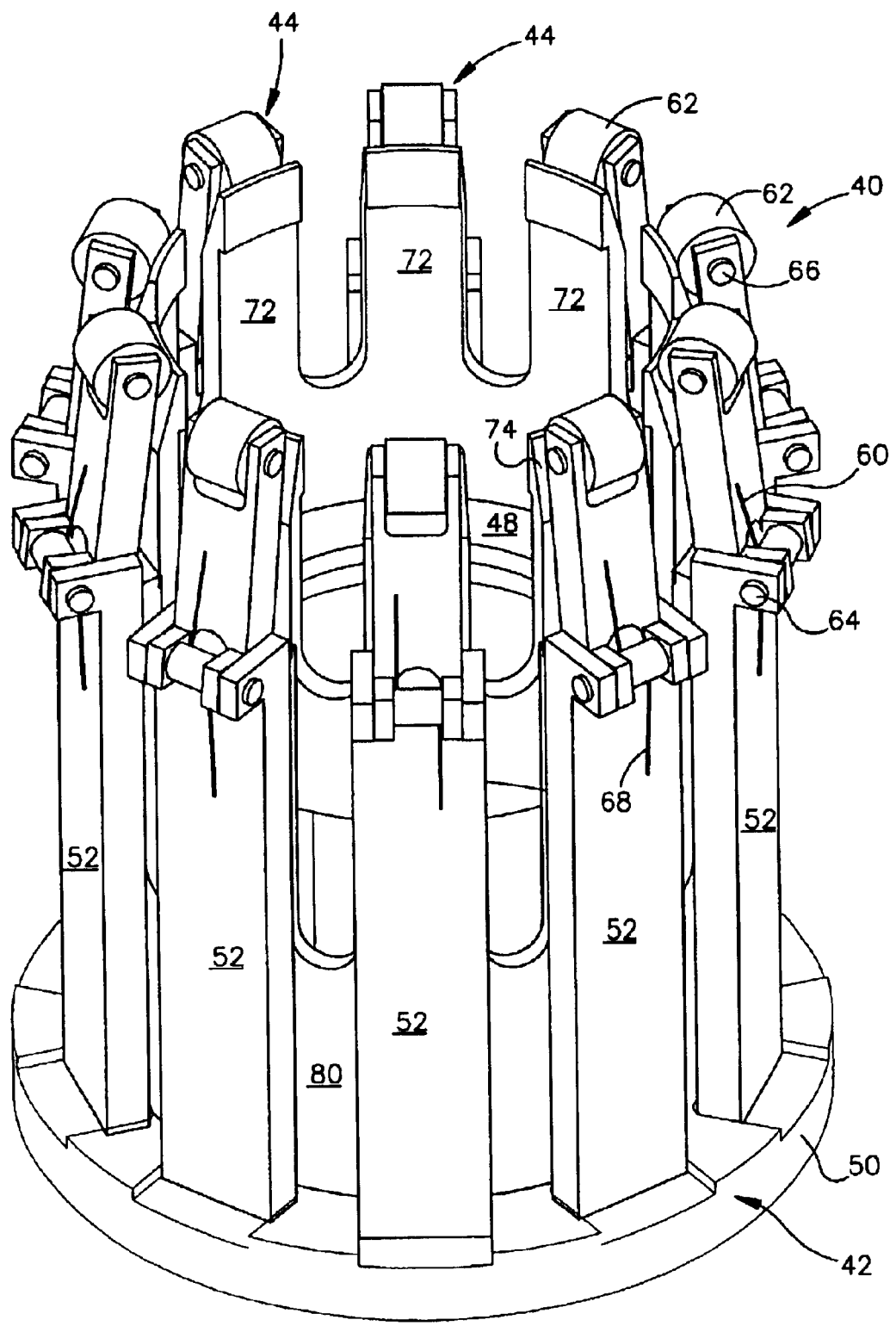
FIG. 3 is a perspective view of a turn-up device according to the present invention.

Referring now to FIGS. 3 and 4, one of the turn-up devices 40 is shown isolated from the rest of the green preform building components. The support member 42 comprises a base plate 50 and a plurality (e.g., ten) of pedestals 52 projecting upward from the base plate 50. Each arm 44 includes a bracket 60 having one end pivotally mounted to one of the pedestals 52 and an opposite end to which a roller 62 is rotatably mounted. Suitable fasteners are used to accomplish these attachments. For example, in the illustrated embodiment, a pin fastened by retaining clips 64 is inserted through aligned openings in the pedestal 52 and the bracket 60 and another pin fastened by retaining clips 66 is inserted through aligned openings in the bracket 60 and the roller 62. A biasing member 68 (e.g., a torsion spring surrounding the retaining clip 64) is provided on each arm 44 to urge it to pivot radially inward relative to the pedestal 52.

The sleeve 46 is positioned within the cylindrical space defined by the arms 44 and comprises a crown-shaped structure having a plurality (e.g., ten) of fingers 72 aligned with the turning arms 44. The distal end of each finger 72 is contoured to form a cam surface 74 for riding contact with the respective arm roller 62. The non-fingered circumference of the sleeve 46 is attached to the platform 48 which is resiliently mounted to the support member 42 by spring-loaded bolts 78. A guide tube 80 can be positioned within the pedestals 52 so that the sleeve 46 telescopically slides therein during compression/extension of the spring-loaded platform 48.

Figure 5A:
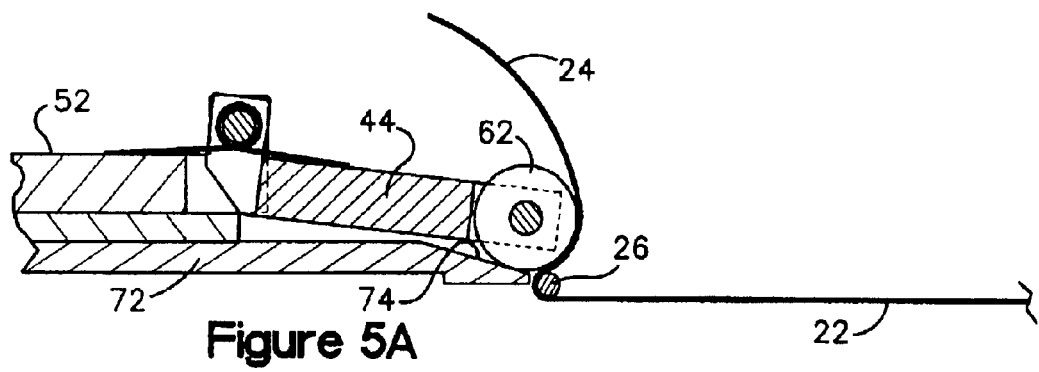
FIGS. 5A–5C are schematic close-up views showing the interaction between certain components of the turn-up device.
Figure 5B:
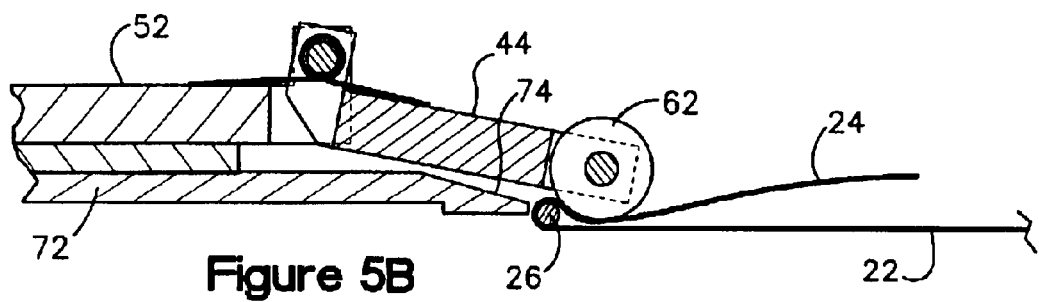
Figure 5C:
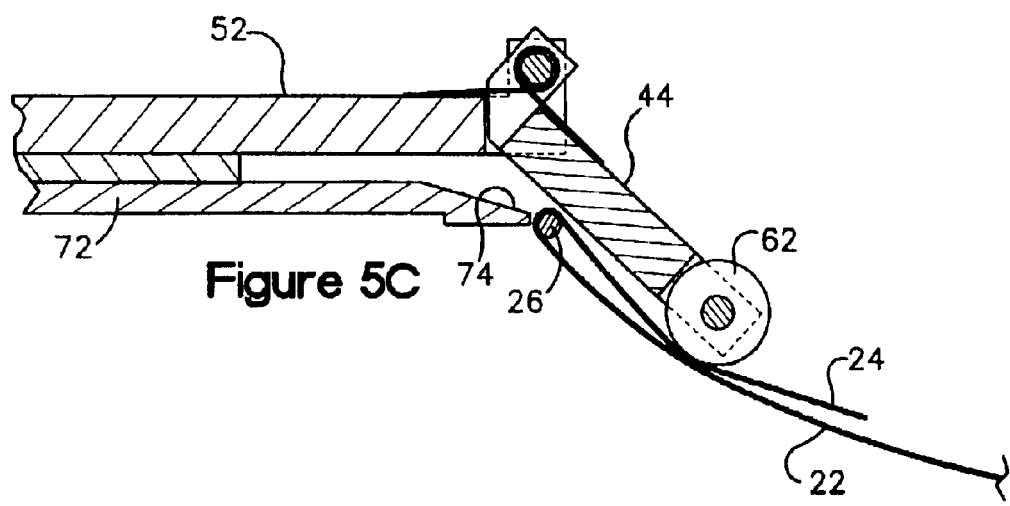

Referring now to FIGS. 5A–5C, the interaction between a turning arm 44, its respective cam surface 74, and the bead ring 26 is schematically shown in a close-up fashion. When the platform 48 contacts the drum cap 36, the distal ends of the fingers 72 are positioned just behind the bead ring 26 and the roller 62 rests on the cam surface 74 whereby the arm 44 is held in its radially outer position. (FIG. 5A.) Upon continued inward movement of the turning arm 44 (but not the finger 72), the roller 62 rides off of the cam surface 74 once it clears the centerline of the bead ring 26. (FIG. 5B.) Upon release from the finger 72, the arm 44 pivots radially inward to follow the profile of the drum 30. (FIG. 5C.)

The rollers 62 act not only as cam-followers, but also support the fabric during the turn-up process thereby allowing the consistent accomplishment of longer turn-ups. Also because the arms 44 are biased radially inward, they can automatically follow the profile of the drum without tight tolerance requirements. Furthermore, because the arms 44 are not released from their radially outer position until after they clear the bead ring 26, there is no danger of the bead 26 being pushed out of its seat and bead-holding means are not necessary.

One can now appreciate that the present invention provides an improved turn-up device 40 for making a molded body of an air spring on a mechanical drum having expandable end portions. Although the invention has been shown and described with respect to certain embodiments, it is obvious that equivalent alterations and modifications will occur to others skilled in the art upon the reading and understanding of this specification. The present invention includes all such alterations and modifications and moreover is limited only by the scope of the following claims.

What is claimed is:

1. A turn-up device for making a molded body of an airspring on a mechanical drum having an expandable end portion with segments that are radially spaced-apart from each other defining spaces when the end portion is in an expanded condition, said device comprising:

a support member configured to be movable towards the end portion of the drum;

a plurality of turning arms pivotally mounted to the support member, each turning configured to be moved between a radially outer position and a radially inner position and biased to the radially inner position;

a sleeve mounted to the support member and moveable relative to the turning arms between a first position where the sleeve holds the turning arms in the radially outer position and a second position where the sleeve releases the turning arms so that they can be biased to the radially inner position, the sleeve includes fingers each having a cam surface, the fingers configured to be aligned with the turning arms for insertion into the spaces between the segments of the expandable end portion of the drum, the turning arms each include a roller which rides on the cam surface as the sleeve moves relative to the arms; and a guide tube mounted to the support member and configured to permit the sleeve to telescopically slide within the guide tube as it moves relative to the turning arms.

2. A turn-up device as set forth in claim 1, wherein the support member includes a plate and pedestals projecting outward form the plate and wherein the turning arms are pivotally mounted to respective pedestals.

3. A method of making a molded body of an airspring on a mechanical drum having an expandable end portion, said method comprising the steps of:

wrapping fabric plies around the drum;

positioning bead rings so that they are axially aligned with desired seats;

expanding end portions of the drum to seat the bead rings;

turning an end section of the fabric plies over one of the bead rings with a turn-up device as set forth in claim 1; and turning an opposite end section of the fabric plies over the other bead ring with another turn-up device as set forth in claim 1.

4. A method as set forth in claim 3, wherein each of said turning steps comprises:

positioning the turning device adjacent the respective end portion of the drum so that its turning arms are aligned with spaces between segments of the expanded end portions of the drum;

moving the support member inwardly towards the end portion of the drum so that the turning arms contact the end section of the fabric plies while the sleeve is in the position which holds the turning arms in their radially outer position; and moving the sleeve relative to the arms to the position whereat it releases the arms so that they can be biased to the radially inner position.

5. A method as set forth in claim 4, wherein the sleeve-moving step comprises releasing the arms for biasing to the radially inner position after clearance of a centerline of the bead ring.

6. A method a set forth in claim 5, wherein each of the turning arms includes a roller and the sleeve has a cam surface for each of the rollers and wherein the sleeve-moving step comprises the roller riding on the cam surface.

7. A method as set forth in claim 6, wherein said sleeve is resiliently mounted to the support member and biased to the position whereat it holds the arms in the radially outer position and wherein the sleeve-moving step is performed by the sleeve being pushed towards the support member by a portion of the drum.

8. A method as set forth in claim 7, wherein the resilient mounting of the support member comprises a spring-loaded platform and wherein the platform contacts an end cap of the drum to push the sleeve towards the support member.

9. A turn-up device for making a molded body on a mechanical drum, comprising:

a support member movable towards the end portion of the drum;

turning arms pivotally mounted to the support member for movement between a radially outer position and a radially inner position and biased to the radially inner position; and a sleeve mounted to the support member and movable relative to the turning arms between a position whereat it holds the turning arms in the radially outer position and a position whereat it releases the turning arms so that they can be biased to the radially inner position, the sleeve includes fingers aligned with the turning arms, the fingers each include a cam surface, wherein the turning arms each include a roller which rides on the cam surface as the sleeve moves relative to the arms; and a guide tube mounted to the support member and configured to permit the sleeve to telescopically slide within the guide tube as it moves relative to the turning arms.

10. A turn-up device as set forth in claim 9, wherein the support member includes a plate and pedestals projecting outward from the plate and wherein the turning arms are pivotally mounted to respective pedestals.

* * * * *